(12) United States Patent
Maier et al.

(10) Patent No.: US 7,847,513 B2
(45) Date of Patent: Dec. 7, 2010

(54) SYSTEM FOR CONTROLLING THE POWER OUTPUT OF A FUEL CELL STACK AND BATTERY

(75) Inventors: Oliver Maier, Worms (DE); Peter Kilian, Heidelberg (DE); Jochen Schaffnit, Darmstadt (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/492,975

(22) Filed: Jun. 26, 2009

(65) Prior Publication Data

US 2009/0258269 A1 Oct. 15, 2009

Related U.S. Application Data

(62) Division of application No. 11/449,932, filed on Jun. 9, 2006, now Pat. No. 7,588,847.

(51) Int. Cl.
  *H01M 10/46* (2006.01)
(52) U.S. Cl. .................................................. 320/101
(58) Field of Classification Search ................ 320/101, 320/116, 119; 429/7, 61, 400, 430, 431, 429/432
  See application file for complete search history.

(56) References Cited

U.S. PATENT DOCUMENTS 6,893,757 B2 * 5/2005 Kato ........................... 429/430

2003/0201674 A1 10/2003 Droppo et al.
2004/0018399 A1 1/2004 Jung
2006/0246329 A1 * 11/2006 Gopal et al. ................ 320/101

FOREIGN PATENT DOCUMENTS

| DE | 102 40 763 A 1 | 4/2003 |
| DE | 102 23 117 A 1 | 12/2003 |
| DE | 102 33 821 A 1 | 2/2004 |
| DE | 102 58 204 A 1 | 2/2004 |
| EP | 0 953 472 A2 | 11/1999 |

* cited by examiner

*Primary Examiner*—Edward Tso
(74) *Attorney, Agent, or Firm*—John A. Miller; Miller IP Group, PLC

(57) ABSTRACT

A system for controlling the power output of a fuel cell stack and a battery in a hybrid fuel cell system. The system includes a power damping filter that receives a power request signal, and damps the request to reduce large changes in the power request. A battery state of charge controller receives the difference between a battery state of charge set-point and the actual battery state of charge, and provides a battery power signal that attempts to maintain the battery state of charge at the set-point. The damped power signal and the battery power signal are added to generate a system power demand signal that satisfies the driver power request using the battery power and fuel cell stack power, and uses the fuel cell stack power to charge the battery during low power transients or if the battery state of charge is below the set-point.

8 Claims, 2 Drawing Sheets

SYSTEM FOR CONTROLLING THE POWER OUTPUT OF A FUEL CELL STACK AND BATTERY

CROSS-REFERENCE TO RELATED APPLICATIONS

This application is a divisional application of U.S. patent application Ser. No. 11/449,932, filed Jun. 9, 2006 and titled "Advanced Controls Concept For Hybrid Fuel Cell Systems."

BACKGROUND OF THE INVENTION

1. Field of the Invention

This invention relates generally to a system and method for controlling the power output of a fuel cell stack and battery in a hybrid fuel cell system and, more particularly, to a system and method for controlling the power output of a fuel cell stack and battery in a hybrid fuel cell system, where the method includes using a power damping filter and a battery state of charge (SOC) controller.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The dynamic power of a fuel cell system is limited. Further, the time delay from system start-up to driveability and low acceleration of the vehicle may not be acceptable. During a drive cycle, the stack cell voltage varies because the variable driver power request follows the stack polarization curve. The voltage cycles can decrease the stack durability. These drawbacks can be minimized by using a high voltage battery in parallel with the fuel cell stack. Algorithms are employed to provide the distribution of power from the battery and the fuel cell stack to meet the requested power.

For the reasons discussed above, some fuel cell vehicles are hybrid vehicles that employ a rechargeable supplemental power source in addition to the fuel cell stack, such as a DC battery or a super capacitor (also referred to as an ultra-capacitor or double layer capacitor). The power source provides supplemental power for the various vehicle auxiliary loads, for system start-up and during high power demands when the fuel cell stack is unable to provide the desired power. More particularly, the fuel cell stack provides power to a traction motor and other vehicle systems through a DC voltage bus line for vehicle operation. The battery provides the supplemental power to the voltage bus line during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the battery at those times when the fuel cell stack is able to meet the system power demand. The generator power available from the traction motor during regenerative braking is also used to recharge the battery through the DC bus line.

FIG. 1 is a schematic block diagram of a hybrid fuel cell system 10 including a fuel cell stack 12 and a battery 14 that includes power electronics. In order to provide battery charge or discharge, a voltage difference is needed between the stack voltage and the battery voltage that is greater than or equal to the battery charge. When the stack voltage is greater than the battery voltage, the power electronics operates as a voltage amplifier where the gain is less than or equal to one. The fuel cell stack 12 provides electrical power to a high voltage bus line, represented here as positive bus line 16 and negative bus line 18. In a vehicle fuel cell system, the fuel cell stack 12 may include about 400 fuel cells. The battery 14 is also coupled to the high voltage bus line 16 and 18, and provides supplemental power as discussed above.

The fuel cell system 10 includes a power inverter module (PIM) 22 electrically coupled to the bus lines 16 and 18 and an AC or DC traction motor 24. The PIM 22 converts the DC voltage on the bus lines to an AC voltage suitable for the AC traction motor 24. The traction motor 24 provides the traction power to operate the vehicle, as is well understood in the art. The traction motor 24 can be any suitable motor for the purposes described herein, such as an AC induction motor, an AC permanent magnet motor and an AC three-phase synchronous machine. During regenerative braking when the traction motor 24 is operating as a generator, electrical AC power from the motor 24 is converted to DC power by the PIM 22, which is then applied to the bus lines 16 and 18 to recharge the battery 14. A blocking diode (not shown) prevents the regenerative electrical energy applied to the bus lines 16 and 18 from flowing into the fuel cell stack 12, which could otherwise damage the stack 12.

For a typical hybrid vehicle strategy, the battery 14 is mainly used to increase efficiency, lower the dynamic requirements of the fuel cell system, and/or increase the performance of the vehicle. If the vehicle operator demands more power, the battery 14 can provide the stored energy to the traction motor 24 very fast.

The fuel cell system power demand for certain vehicle drive cycles may require that the fuel cell system operate in very different and fast changing power levels with high power gradients. These frequent changes in power may cause many voltage changes in the stack output power that reduces the lifetime and durability of the stack 12. In addition, fuel cell system components are highly stressed during hard power transients of the fuel cell stack 12. Therefore, a reduction of fast voltage changes will improve the durability of the fuel cell stack. U.S. patent application Ser. No. 11/313,162, titled Floating Baseload Hybrid Strategy for a Hybrid Fuel Cell Vehicle to Increase the Durability of the Fuel Cell System, filed Dec. 20, 2005, assigned to the Assignee of this application and herein incorporated by reference, discloses one such system that reduces fast stack voltage changes.

SUMMARY OF THE INVENTION

In accordance with the teachings of the present invention, a system for controlling the power output of a fuel cell stack and a battery in a hybrid fuel cell system is disclosed. The system includes a power damping filter that receives a driver power request signal, and damps the request to reduce large changes in the power request. A battery state of charge controller receives the difference between a battery state of charge set-point signal and the actual battery state of charge, and provides a battery power signal that attempts to maintain the battery state of charge at the set-point. The damped power request signal and the battery power signal are added to generate a system power demand signal that satisfies the driver power request using the battery power and fuel cell stack power, and uses the fuel cell stack power to charge the battery during low power transients or if the battery state of charge is below the set-point.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for controlling the power output of a fuel cell stack and battery in a hybrid fuel cell system is merely exemplary in nature, and is in no way intended to limit the invention or its applications or uses.

Figure 1:
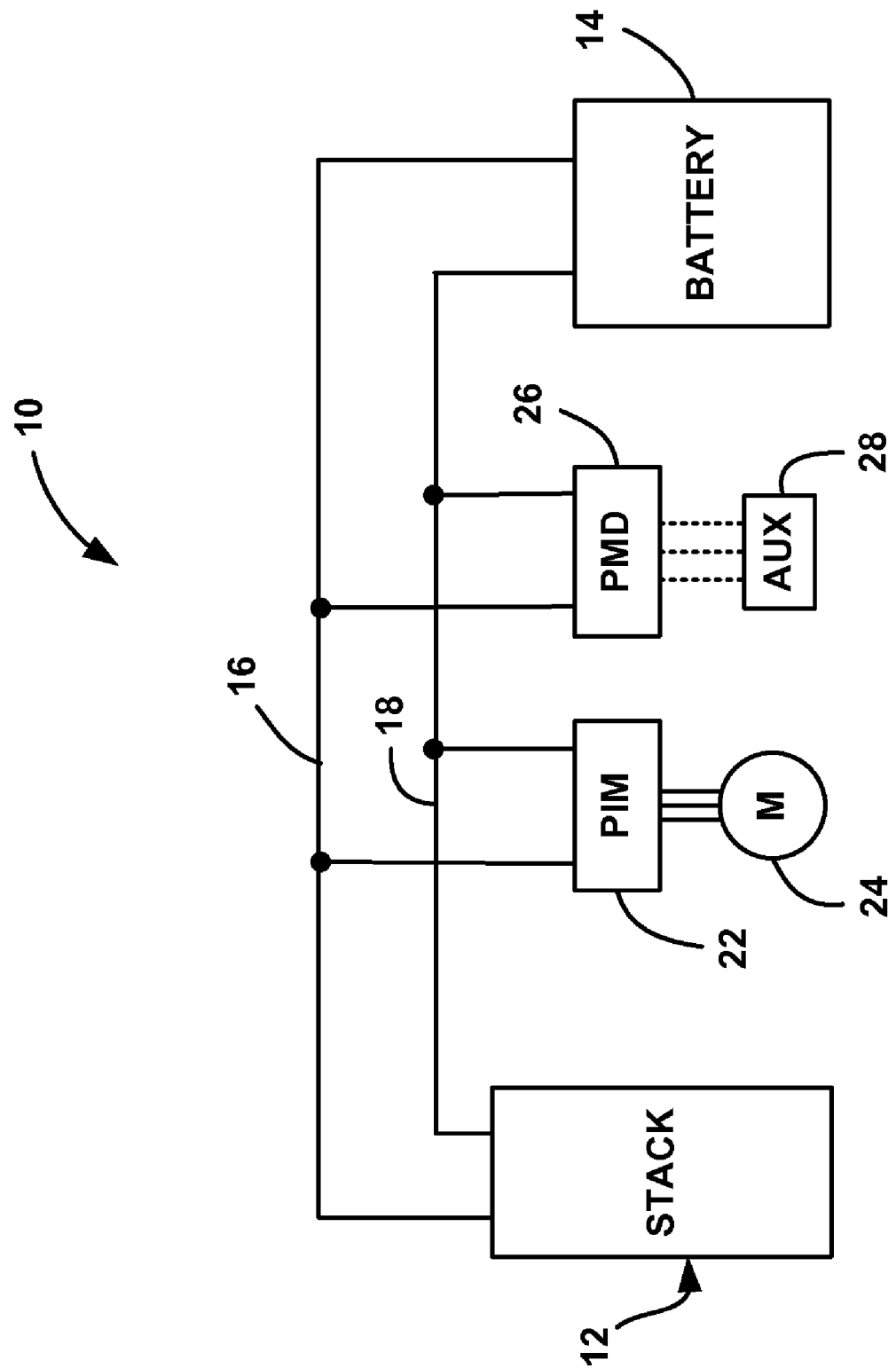
FIG. 1 is a schematic block diagram of a fuel cell system including a fuel cell stack and a high voltage battery.
Figure 2:
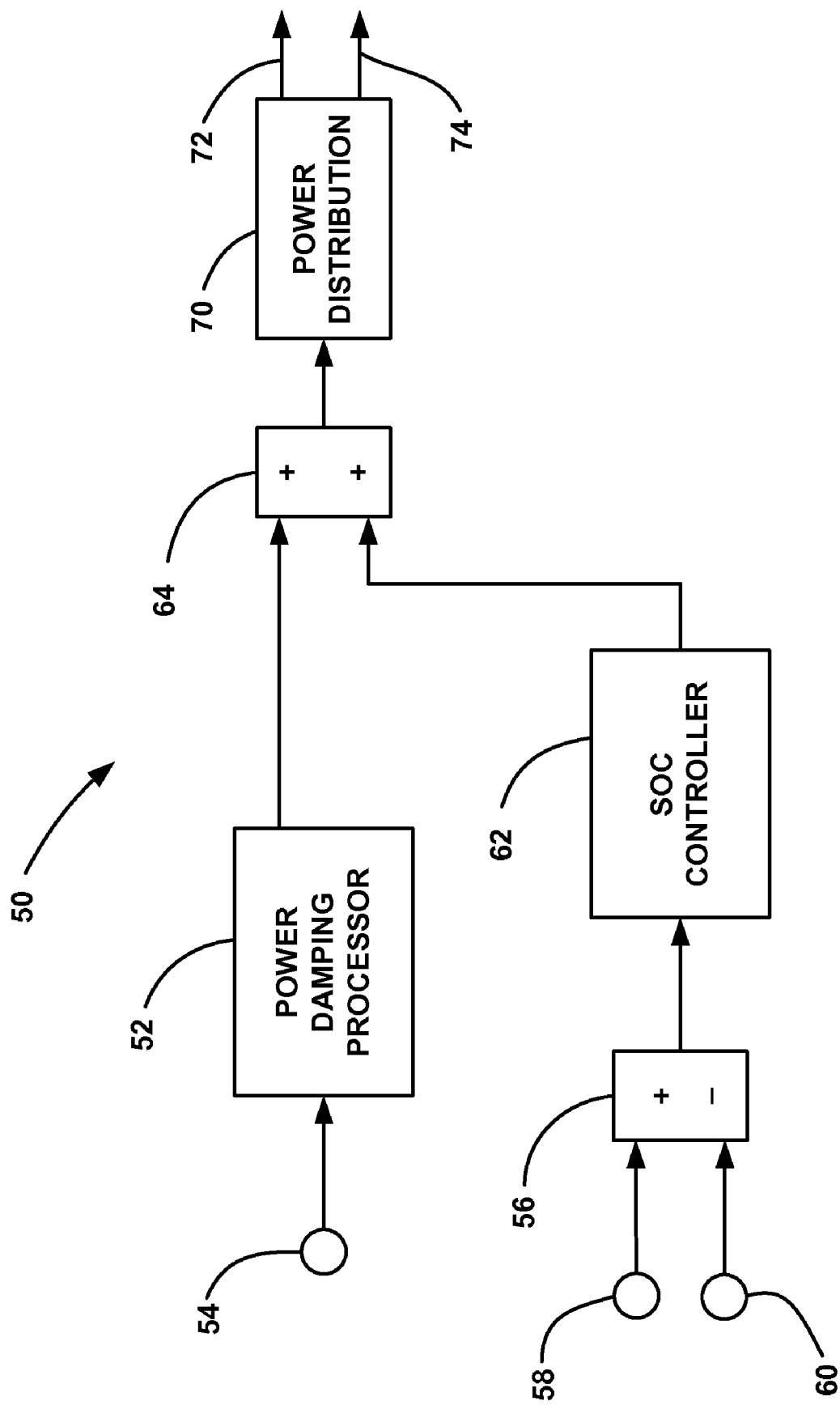
FIG. 2 is a block diagram of a power system for the fuel cell system shown in FIG. 1, according to an embodiment of the present invention.

FIG. 2 is a block diagram of a power system 50 for a hybrid fuel cell vehicle, according to an embodiment of the present invention. The power system 50 includes a power damping processor 52 that receives a driver power request signal at node 54. The power damping processor 52 is a floating base load controller that damps the power request signal to reduce large transients on the power demand from the fuel cell stack 12. In other words, the damping processor 52 provides signal damping to reduce power request transients so that the power request is more slowly changed. In one embodiment, the power damping processor 52 is a first order filter. For example, if the vehicle operator is driving along a highway, and suddenly wishes to brake to idle power, the processor 52 reduces the rate at which the power request is decreased. The excess power generated by the stack 12 as a result of the damping function during the low power transient can be used to charge the battery 14. For high transient power requests, the battery 14 provides the supplemental power as the demand on the fuel cell stack 12 increases at a slower rate that the request. Particularly, the battery power demand is the difference between the driver power request and the fuel cell stack power demand. The base load increases and decreases slower than the transient load requested from the fuel cell stack 12 to increase stack durability.

The power system 50 also includes a battery SOC controller 62 that attempts to maintain the SOC of the battery 14 at a predetermined or optimal value. This value should be set as the mean value between the minimum and maximum of the allowed battery SOC. For example, the battery 14 may have an acceptable state of charge range of 50%-80%, and an optimal SOC of 65%. The optimal battery state of charge or set-point signal is provided to a subtractor 56 at node 58. The SOC set-point may be 65% where there is room to charge the battery 14, such as during regenerative braking, or discharge the battery 14 when extra power is required to supplement the stack power. The actual battery SOC is provided to the subtractor 56 at node 60.

The SOC set-point signal and the battery SOC signal are subtracted by the subtractor 56 and the difference is provided to the battery SOC controller 62. The battery SOC controller 62 processes the difference signal to provide a battery SOC control signal representative of the battery SOC. In one embodiment, the controller 62 is a PI controller. Because of the SOC controller 62, the battery 14 can be charged and discharged over a wider range.

The damped driver power request signal from the power damping processor 58 is added to the battery SOC control signal from the controller 62 by an adder 64. The output of the adder 64 is a power demand signal for both the fuel cell stack 12 and the battery 14 that will identify how much of the battery power will be used for operating the vehicle and how much of the fuel cell stack power will used for recharging the battery 14. The signal from the adder 64 is sent to a power balancing module 70 that provides a power demand signal for the stack 12 on line 72 and a power demand signal for the battery 14 on line 74. The module 70 distributes the power demand between the stack 12 and the battery 14 based on the discussion above. Particularly, if the damped power request signal commands more energy from the stack 12 than is required during low power transients, the supplemental energy is used to charge the battery 14. The battery SOC controller 62 determines whether additional stack power will be commanded to provide more battery charging. During a high power transient, the damped power request signal will be lower than what is requested by the vehicle operator, where the extra power will be satisfied by the battery 14. As the vehicle accelerates and decelerates, the SOC controller 62 operates to attempt to maintain the battery SOC at the optimal level.

During acceleration, the battery power is used to fulfill the power request and the battery SOC decreases. When the required vehicle speed is reached, the SOC controller 62 starts to charge the battery 14 until the SOC set-point is reached. If a relationship between the SOC set-point and an aggression index is generated, for example, a damped derivative of the acceleration pedal, an adaptive algorithm is possible.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:
1. A fuel cell system comprising:
a fuel cell stack;
a power source;
a power damping processor responsive to a driver request signal and providing a damped driver request signal;

a subtractor responsive to a predetermined power source state of charge (SOC) set-point signal and an actual power source SOC signal, said subtractor providing a difference signal between the SOC set-point and the actual power source SOC;

an SOC controller responsive to the difference signal and generating a power source SOC signal;

an adder adding the damped power request signal and the power source SOC signal to provide a fuel cell system power signal; and a power balancing module responsive to the fuel cell system power signal and determining how much power is provided by the fuel cell stack, how much power is provided by the battery and how much fuel cell stack power is used to recharge the battery during low power and high power transients.

2. The system according to claim 1 wherein the power damping processor is a first order filter.

3. The system according to claim 1 wherein the SOC controller is a PI controller.

4. The system according to claim 1 wherein the SOC controller attempts to maintain the battery state of charge at the SOC set-point.

5. The system according to claim 4 wherein the SOC set-point is about 65% of the maximum battery SOC.

6. The system according to claim 1 wherein the power source is a battery.

7. The system according to claim 1 wherein the controller provides excess fuel cell stack power at low power transients to charge the battery and uses battery power to supplement the fuel cell stack power at high power transients.

8. The system according to claim 1 wherein the system is on a hybrid fuel cell system vehicle.

* * * * *